United States Patent
Espinosa Santos et al.

(10) Patent No.: US 12,010,002 B2
(45) Date of Patent: Jun. 11, 2024

(54) USER PLANE FUNCTION SELECTION BASED ON PER SUBSCRIBER CPU AND MEMORY FOOTPRINT FOR PACKET INSPECTION

(71) Applicant: Telefonaktiebolaget LM Ericsson (publ), Stockholm (SE)

(72) Inventors: Julian Espinosa Santos, Madrid (ES); Rodrigo Alvarez Dominguez, Madrid (ES); Miguel Angel Muñoz De La Torre Alonso, Madrid (ES)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 18/010,380

(22) PCT Filed: Nov. 11, 2020

(86) PCT No.: PCT/IB2020/060615
§ 371 (c)(1),
(2) Date: Dec. 14, 2022

(87) PCT Pub. No.: WO2022/013608
PCT Pub. Date: Jan. 20, 2022

(65) Prior Publication Data
US 2023/0239227 A1    Jul. 27, 2023

(30) Foreign Application Priority Data
Jul. 15, 2020 (EP) .................................... 20382636

(51) Int. Cl.
*H04L 43/04* (2022.01)
*H04L 43/028* (2022.01)
*H04L 67/51* (2022.01)

(52) U.S. Cl.
CPC ............ *H04L 43/04* (2013.01); *H04L 43/028* (2013.01); *H04L 67/51* (2022.05)

(58) Field of Classification Search
CPC ........ H04L 43/04; H04L 43/028; H04L 67/51
(Continued)

(56) References Cited

U.S. PATENT DOCUMENTS

2010/0158009 A1* 6/2010 Lee ...................... H04L 47/2441
                                                                370/392
2018/0121544 A1    5/2018 Cho et al.
(Continued)

FOREIGN PATENT DOCUMENTS

WO    2020032769 A1    2/2013
WO    2019158777 A1    8/2019
WO    2020032769 A1    2/2020

OTHER PUBLICATIONS

Nokia, et al., "Solution to Key Issue #6: NWDAF analytics usage for UPF selection", 3GPP TSG-SA WG2 Meeting #129, Dongguan, P.R. China, Oct. 15-19, 2018, pp. 1-2, S2-1811120.
(Continued)

*Primary Examiner* — Ruolei Zong
(74) *Attorney, Agent, or Firm* — COATS & BENNETT, PLLC

(57) ABSTRACT

Techniques are provided to enable the SMF or other network node performing UPF selection to determine a computational resource demand, also referred to herein as the computational footprint, associated with a PDU session. The computational footprint can then be used by the SMF or other network node to inform the selection of the UPF.

24 Claims, 13 Drawing Sheets

(58) Field of Classification Search
USPC .......................................................... 709/224
See application file for complete search history.

(56) References Cited

U.S. PATENT DOCUMENTS

| | | | |
|---|---|---|---|
| 2020/0059992 A1* | 2/2020 | Skog ....................... | H04L 45/38 |
| 2020/0099742 A1* | 3/2020 | Puente Pestaña ... | H04L 67/1076 |
| 2020/0275313 A1* | 8/2020 | He .................... | H04W 28/0838 |
| 2020/0344662 A1* | 10/2020 | Maino .................. | H04L 43/028 |
| 2021/0058366 A1* | 2/2021 | Mas Rosique .......... | H04W 4/24 |
| 2021/0099367 A1* | 4/2021 | Han ..................... | H04W 24/10 |
| 2021/0314266 A1* | 10/2021 | Li .......................... | H04L 47/20 |
| 2021/0329485 A1* | 10/2021 | Han ................. | H04W 28/0236 |
| 2022/0385550 A1* | 12/2022 | Villasante ........... | H04L 47/2441 |

OTHER PUBLICATIONS

3rd Generation Partnership Project, "3rd Generation Partnership Project; Technical Specification Group Services and System Aspects; Architecture enhancements for 5G System (5GS) to support network data analytics services (Release 16)", Technical Specification, 3GPP TS 23.288 V.16.2.0 (Dec. 2019), pp. 1-57.

3rd Generation Partnership Project, "3rd Generation Partnership Project; Technical Specification Group Services and System Aspects; System architecture for the 5G System (5GS); Stage 2 (Release 16)", Technical Specification, 3GPP TS 23.501 V16.3.0 (Dec. 2019), pp. 1-417.

\* cited by examiner

USER PLANE FUNCTION SELECTION BASED ON PER SUBSCRIBER CPU AND MEMORY FOOTPRINT FOR PACKET INSPECTION

RELATED APPLICATIONS

This application claims priority to EP Application No. 20382636.7, filed 15 Jul. 2020, disclosure of which is incorporated in its entirety by reference herein.

TECHNICAL FIELD

The present disclosure relates generally to selection of a user plane function (UPF) for a packet data unit (PDU) session in a wireless communication network and, more particularly, to UPF selection based on per subscriber CPU and memory footprints for packet inspection.

BACKGROUND

When a user establishes a packet data unit (PDU) session with the network, a user plane function (UPF) is selected by a session management function (SMF) or other network node based on various criteria including the dynamic load on the UPF, the UPF's location, the UPF's capabilities and the functionality required to support the PDU session, the PDU session type, the subscriber profile of the UE, the access network used by the UE, the radio access technology being used by the UE, the Data Network Name (DNN), the UPF's relative static capacity among UPFs supporting the same DNN, and local operator policies. This list of factors is not exclusive and other factors may be considered.

The UPF is responsible for the handling of user plane traffic. One of the functions performed by the UPF is classification of packet flows so that the packet flows can be assigned to Quality of Service (QoS) flows in the network. The classification of packet flows requires inspection of packets contained in the packet flow. The level of inspection needed to classify a packet flow can depend on numerous parameters. In some cases, a packet flow may be classified by examining only header information. In other cases, deep packet inspection of application layer data may be required. The level of inspection needed to classify packet flows can have a significant impact on the use of computational resources (e.g., central processing unit (CPU) and memory resources) needed to process the packet flow. Having per subscriber information about computational resource demand would be useful in UPF selection in order to distribute computational loads more evenly among the available UPFs, or to assign PDU session associated with large computational loads to specific UPFs. By making the distribution of computational loads more predictable, more accurate dimensioning of UPF resources is possible, which will improve resource utilization.

SUMMARY

The present disclosure describes techniques to enable the SMF or other network node performing UPF selection to determine a computational resource demand, also referred to herein as the computational footprint, for inspection of a particular packet flow. The computational footprint can then be used by the SMF or other network node to inform the selection of the UPF. Generally, a network data analytics function (NWDAF) collects information regarding packet inspection from multiple UPFs and generates per subscriber models of the computational resource demand in terms of CPU footprint and memory footprint associated with each subscriber. The footprint model can be dynamically updated over time as additional data is collected. When a UE establishes a packet data session, the SMF retrieves the CPU footprint and/or memory footprint, i.e. computational footprint, associated with the subscriber from the UDR and selects the UPF based at least in part on the computational footprint. For example, the SMF may use the footprint information to distribute computational loads more evenly among the available UPFs, or to assign PDU sessions associated with large computational loads to specific UPFs. These techniques enable more accurate dimensioning of subscribers and network resources and more efficient use of the resources at each UPF.

A first aspect of the disclosure comprises methods implemented by a UPF to support UPF selection. The UPF optionally registers, with a service discovery function, a capability to provide one or more packet inspection parameters for packet data inspection. The UPF collects one or more packet inspection parameters associated with packet inspection for a subscriber, a service, or both, for determining a computational footprint associated with the packet inspection. The UPF sends the packet inspection parameters to another network node.

A second aspect of the disclosure comprises methods implemented by a NWDAF or other network node for computing a computational footprint for use in UPF selection. The NWDAF receives one or more inspection parameters associated with packet inspection for a subscriber, a service, or both. The NWDAF further computes a computational footprint associated with packet inspection for the subscriber, the service, or both, based on the received packet inspection parameters. The NWDAF makes the computational footprint for the subscriber, the service, or both, available to a session management function or other network node for use in UPF selection.

A third aspect of the disclosure comprises methods of UPF selection implemented by a SMF or other network node. The SMF receives a request to create a packet data session for UE. Responsive to the request to create a packet data session, the SMF obtains session management subscription data including a computational footprint indicative of the computational resources needed to perform packet inspection for one or more traffic flows included in the packet data session. The SMF then selects a UPF for the packet data session based at least in part on the computational footprint for packet inspection.

A fourth aspect of the disclosure comprises a UPF configured to provide data supporting UPF selection. The UPF is configured to register, with a service discovery function, a capability to provide one or more packet inspection parameters for packet data inspection. The UPF is further configured to collect one or more packet inspection parameters associated with packet inspection for a subscriber, a service, or both, for determining a computational footprint associated with the packet inspection. The UPF is further configured to send the packet inspection parameters to another network node.

A fifth aspect of the disclosure comprises a NWDAF or other network node for computing a computational footprint for use in UPF selection. The NWDAF is configured to receive one or more packet inspection parameters associated with packet inspection for a subscriber, a service, or both. The NWDAF is further configured to compute a computational footprint associated with packet inspection for the subscriber, the service, or both, based on the received packet inspection parameters. The NWDAF is further configured to make the computational footprint for the subscriber, the service, or both, available to a session management function or other network node for use in UPF selection.

A sixth aspect of the disclosure comprises a SMF or other network node configured for UPF selection. The SMF is configured to receive a request to create a packet data session for UE. The SMF is further configured to, responsive to the request to create a packet data session, obtain session management subscription data including a computational footprint indicative of the computational resources needed to perform packet inspection for one or more traffic flows included in the packet data session. The SMF is further configured to select a UPF for the packet data session based at least in part on the computational footprint for packet inspection.

A seventh aspect of the disclosure comprises a UPF configured to provide data supporting UPF selection. The UPF comprises communication circuitry for communicating other network nodes (e.g., NWDAF) in the communication network and processing circuitry. The processing circuitry is configured to register, with a service discovery function, a capability to provide one or more packet inspection parameters for packet data inspection. The processing circuitry is further configured to collect one or more packet inspection parameters associated with packet inspection for a subscriber, a service, or both, for determining a computational footprint associated with the packet inspection. The processing circuitry is further configured to send the packet inspection parameters to another network node.

An eighth aspect of the disclosure comprises a NWDAF or other network node for computing a computational footprint for use in UPF selection. The NWDAF comprises communication circuitry for communicating other network nodes (e.g., UPF, UDR, etc.) in the communication network and processing circuitry. The processing circuitry is configured to receive one or more inspection parameters associated with packet inspection for a subscriber, a service, or both. The processing circuitry is further configured to compute a computational footprint associated with packet inspection for the subscriber, the service, or both, based on the received packet inspection parameters. The processing circuitry is further configured to make the computational footprint for the subscriber, the service, or both, available to a session management function or other network node for use in UPF selection.

A ninth aspect of the disclosure comprises a SMF or other network node configured for UPF selection. The UPF comprises communication circuitry for communicating other network nodes (e.g., UDR, UPF) in the communication network and processing circuitry. The processing circuitry is configured to receive a request to create a packet data session for UE. The processing circuitry is further configured to, responsive to the request to create a packet data session, obtain session management subscription data including a computational footprint indicative of the computational resources needed to perform packet inspection for one or more traffic flows included in the packet data session. The processing circuitry is further configured to select a UPF for the packet data session based at least in part on the computational footprint for packet inspection.

A tenth aspect of the disclosure comprises a computer program for UPF or other network node configured to provide data supporting UPF selection. The computer program comprises executable instructions that, when executed by processing circuitry in the credential server causes the credential server to perform the method according to the first aspect.

An eleventh aspect of the disclosure comprises a computer program for a NWDAF or other network node for configured to compute a computational footprint for use in UPF selection. The computer program comprises executable instructions that, when executed by processing circuitry in the network node causes the network node to perform the method according to the second aspect.

A twelfth aspect of the disclosure comprises a computer program for a SMF or other network node for making a UPF selection. The computer program comprises executable instructions that, when executed by processing circuitry in the network node causes the network node to perform the method according to the third aspect.

A thirteenth aspect of the disclosure comprises a carrier containing a computer program according to the tenth aspect. The carrier is one of an electronic signal, optical signal, radio signal, or a non-transitory computer readable storage medium.

A fourteenth aspect of the disclosure comprises a carrier containing a computer program according to the eleventh aspect. The carrier is one of an electronic signal, optical signal, radio signal, or a non-transitory computer readable storage medium.

A fifteenth aspect of the disclosure comprises a carrier containing a computer program according to the twelfth aspect. The carrier is one of an electronic signal, optical signal, radio signal, or a non-transitory computer readable storage medium.

DETAILED DESCRIPTION

Figure 1:
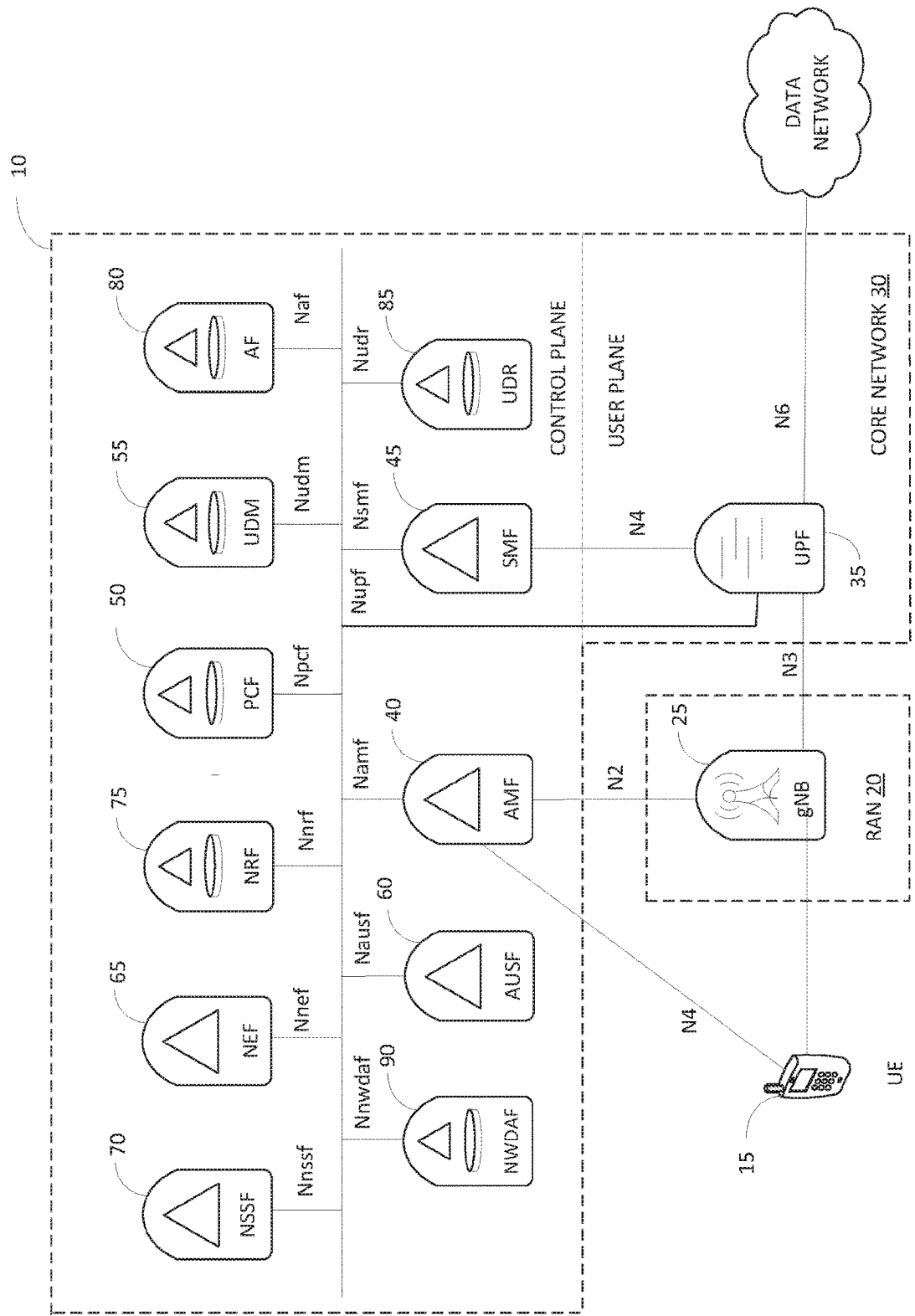
FIG. 1 illustrates the main functional components of a wireless communication network implementing the UPF selection techniques as herein described.

Referring now to the drawings, an exemplary embodiment of the disclosure will be described in the context of a Fifth Generation (5G) communication network. Those skilled in the art will appreciate that the principles and techniques herein described are not limited to use in 5G networks but may also be used in communication networks operating according to other standards where UPF selection is performed.

FIG. 1 illustrates a communication network 10 according to one exemplary embodiment. The communication network 10 comprises a 5G radio access network (RAN) 20 and a core network 30 employing a service-based architecture. The RAN 20 comprises one or more base stations 25 that implement the Next Radio (NR) interface and provide radio access to UEs 15 operating in the communication network 10. The base stations 25 implementing the NR interface are referred to in applicable standards as gNodeBs (gNBs). Those skilled in the art will appreciate that other types of RANs in addition to the 5G RAN 20 can connect to the 5GC 30. For example, an Evolved Universal Mobile Telecommunications System (UMTS) Terrestrial Radio Access (EUTRA) base station in an Evolved UMTS Terrestrial Radio Access Network (EUTRAN) may also connect to the 5GC 30. The UEs 15 may comprise cellular phones, smart phones, tablets, laptop computers, or other electronic devices with communication capabilities. The core network 30, referred to herein as a 5G Core (5GC), provides a connection between the RAN 20 and other packet data networks, such as the Internet Protocol (IP) Multimedia Subsystem (IMS) or the Internet.

The 5GC 30 comprises a number of Network Function (NFs) as illustrated in FIG. 1. The NFs in the 5GC 30 include a User Plane Function (UPF) 35, an Access and Mobility Management Function (AMF) 40, a Session Management Function (SMF) 45, a Policy Control Function (PCF) 50, a Unified Data Management (UDM) function 55, a Authentication Server Function (AUSF) 60, a Network Exposure Function (NEF) 65, a Network Slice Selection Function (NSSF) 70, a Network Repository Function (NRF) 75, an Application Function (AF) 80 (which may be located in the core network 30 or be external to the core network 30), a Unified Data Repository (UDR) 85 and a Network Data Analytics Function (NWDAF) 90.

The NFs shown in FIG. 1 comprise logical entities that reside in one or more core network nodes, which may be implemented by one or more processors, hardware, firmware, or a combination thereof. The NFs may reside in a single core network node or may be distributed among two or more core network nodes. Further, the network 10 may include multiple instances of the NFs.

In conventional communication network, the various NFs (e.g., UPF 35, SMF 45, AMF 40, PCF 50, etc.) in the 5GC 30 communicate with one another over predefined interfaces. In the service-based architectures shown in FIG. 1, the 5GC 30 uses a services model in which the NFs query the NRF 75 or other NF discovery node to discover and communicate with each other. The NFs can subscribe to receive notification services and data from other NFs. In this context, the NF providing the service or data is referred to as a service producer and the NF receiving the data and reports is referred to as a service consumer. In conventional 5G networks, the UPF 35 is an exception and uses a pre-defined interface denoted as the N4 interface to communicate with the SMF 45. One aspect of the disclosure is the addition of new service based interface (SBI) for the UPF 35 denoted the Nupf interface to enable the UPF 35 to communicate with other NFs in the 5GC 30.

Figure 2:
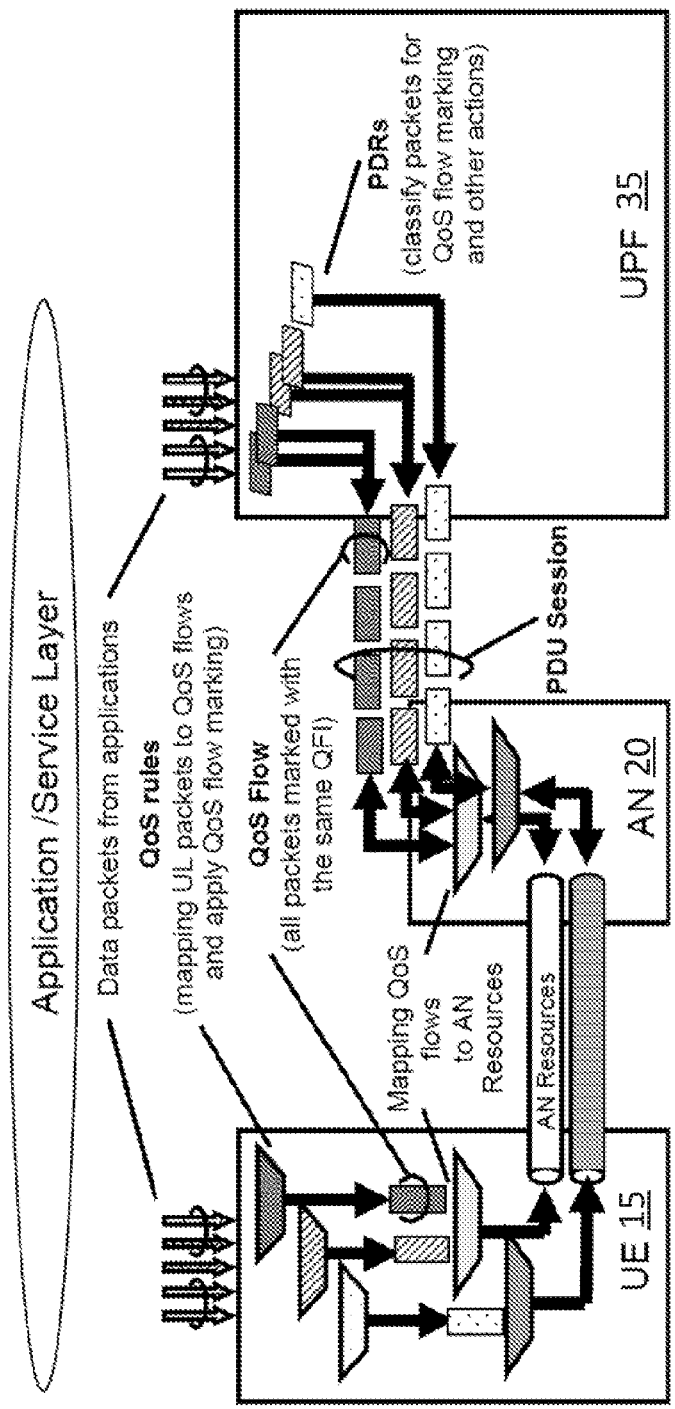
FIG. 2 illustrates packet flow classification by a UPF in a wireless communication network.

This disclosure relates to selection of the UPF for a PDU session. The UPF 35 is responsible for the handling of user plane traffic. One of the functions performed by the UPF 35 is classification of packet flows and mapping of the packet flows to Quality of Service (QoS) flows in the communication network. Referring to FIG. 2, data packets arriving at the UPF 35 from outside the network 10 are classified by the UPF 35, assigned to a QoS flow and marked with a QoS Flow Identifier (QFI). Within the RAN 20, the QoS flows are then mapped to radio bearers and transmitted to the UE 15. In the opposite direction, the UE 15 maps uplink data packets to corresponding QoS flows, which are mapped to radio bears and transmitted to the base station 25, which forwards the QoS flows to the UPF 35.

To classify Internet Protocol (IP) packets arriving from outside the network, the UPF 35 is configured with a set of packet detection rules (PDRs). The PDRs are applied in sequence to data packets within a packet flow until the packet flow can be classified and assigned to a particular QoS flow within a Packet Data Unit (PDU) session. The classification of the packet flows may require the UPF 35 to inspect not only the packet headers, but also the application layer content in data packets, a process known as deep packet inspection (DPI). The header typically includes a 5 tuple comprising: the IP source address, the IP destination address, the source transport address, the destination transport address, and the transport protocol (e.g., Transport Control Protocol (TCP) or Uniform Datagram Protocol (UDP)). In some cases, it may be possible to classify a packet flow based only on header information. In other cases, DPI of application layer information carried by IP data packets is required.

When a user establishes a PDU session with the network 10, a UPF 35 is selected by the SMF 45 based on various criteria including the dynamic load on the UPF 35, the UPF's location; the UPF's capabilities and the functionality required to support the PDU session; the PDU session type; the subscriber profile of the UE 15; the access network used by the UE 15; the radio access technology being used by the UE 15; the Data Network Name (DNN); the UPF's relative static capacity among UPFs 35 supporting the same DNN, and local operator policies. This list of factors is not exclusive and other factors may be considered. A more comprehensive listing of factors used in UPF selection can be found in Technical Speciation (TS) 23.501, subclause 6.3.3.3.

To aid in UPF selection, the NWDAF 90 may collect load information from the UPFs 35 and make this information available to the SMF 45 for UPF selection. For example, the NWDAF 90 can obtain information about load level and number of subscribers for the UPF 35, from which it can compute aggregate statistics such as the average load on the UPF 35 per subscriber. However, information about the computational resource demand in terms of memory usage and central processing unit (CPU) usage per subscriber are not available.

Having per subscriber information about computational resource demand would be useful to the SMF 45 in UPF selection. Knowing the demand on CPU usage and memory usage for a PDU session for a particular subscriber would enable the SMF 45 to make UPF selection more efficiently. However, the computational resource demand can vary greatly from one subscriber to another and from one UPF 35 to another. For example, different packet flows for different subscribers may require different levels of packet inspection in order to classify the packet flows and map the packets to QoS flows. Thus, packet flows with the same volume of data packets may place widely different demands on computational resources. The packet inspection for one packet flow may require relatively few computational resources while the packet inspection for a different packet flow may require a far greater amount of computational resources due, for example, to the need to perform DPI or to the number of PDRs that need to be applied to classify the packet flow. Also, each UPF 35 may have its own set of PDRs and policies for performing packet inspection so that packet inspection for one UPF 35 may use more computational resources than another UPF 35. Currently, there is no way for the SMF 45 to determine the demand on computational resources attributable to a PDU session.

According to one aspect of the disclosure, techniques are provided to enable the SMF 45 or other network node performing UPF selection to determine a computational resource demand, also referred to herein as the computational footprint, of PDU session. The computational footprint can then be used by the SMF 45 or other network node to inform the selection of the UPF 35 during PDU session establishment. For example, the SMF 45 may want to distribute PDU sessions associated with high computational demands (i.e., with large computational footprints) evenly among the available UPFs 35. Distributing the PDU sessions with high demands more evenly can prevent overloading of a UPF 35 when there is a surge in the packet flows. As another example, the SMF 45 may want to assign PDU sessions associated with high computational demands to a UPF 35 in a preferred group of UPFs 35 based on the available processing resources at the UPFs 35 in the preferred group.

The techniques herein described provide a mechanism for selecting a UPF 35 for a PDU session based on historical CPU and memory usage associated with the subscriber. Generally, the NWDAF 90 collects information regarding packet inspection from multiple UPFs 35 and generates per subscriber models of the computational resource demand in terms of CPU footprint and memory footprint associated with each subscriber. The NWDAF 90 stores the models of the computational footprints for each subscriber in the UDR 55. The models can be dynamically updated over time as additional data is collected. When a UE 15 establishes a PDU session, the SMF 45 retrieves the CPU footprint and/or memory footprint associated with the subscriber from the UDR 55 and selects the UPF 35 based at least in part on the computational footprint. For example, the SMF 45 may use the footprint information to distribute computational loads associated with PDU sessions more evenly among the available UPFs 35, or to assign PDU sessions associated with large computational loads to specific UPFs 35. These techniques enable more accurate dimensioning of subscribers and network resources and more efficient use of the resources at each UPF 35.

In some embodiments, the UPF 35 collects information on a per subscriber basis and the NWDAF 90 generates per subscriber models of the computational footprint. The computational footprint for a PDU session in this case is specific to the UE 15 for which the PDU session is being established. In other embodiments, the UPF 35 collects information on a per subscriber type basis and the NWDAF 90 generates a model of the computational footprint for PDU sessions based on the subscriber type of the UE 15 for which the PDU session is being established.

In addition to per subscriber and per subscriber type models, the UPF 35 may provide more granular information based on services associated with the PDU session. The computational footprint for a PDU session in this case is determined based on the types of service associated with the PDU session. Thus, in one embodiment, the NWDAF 90 may generate a footprint model for each service for each subscriber for which the PDU session is being established.

To implement the techniques, the UPF 35 is configured with a SBI denoted Nupf, in addition to the N4 interface with the SMF 45, to enable the UPF 35 to communicate with other NFs in the 5GC 30. The UPF 35 collects information related to packet inspection and makes this information available to other NFs via the exposure service. Information collected by the UPF 35 may include, for example, the following:

a. Packets needed to identify the traffic. DPI technology does not need to look into all packets of a traffic flow to identify the traffic. In some cases, the UPF 35 can determine the traffic type by looking into a few of the initial packets in the packet flow.

b. Number of PDRs matched. This parameter specifies the number of PDRs that are applied per each subscriber.

c. PDR depth average. This parameter specifies the average number of PDRs that are applied before the UPF 35 finds the right PDR per the subscriber. A longer PDR depth means higher CPU costs.

d. Number of Service Functions (SFs). The UPF manages a set of Service Function (SF) (included in a service chain) that has to be traversed according to policies enforced by PCF 50. This parameter defines how many SF's are needed for each subscriber and/or service in average.

e. Time. The parameter specifies the average time needed to identify the traffic for each subscriber;

f. Other parameters. As one example, the type of analysis performed by the UPF 35 can impact CPU usage. Heuristic detection, for example, consumes more CPU resources than identifying only one parameter of the packet.

This information is referred to herein as packet inspection parameters (PIPs). As noted above, the PIPs may collected on a per subscriber or per subscriber type basis. Additionally, the UPF 35 may PIPs for each service type.

Figure 3:
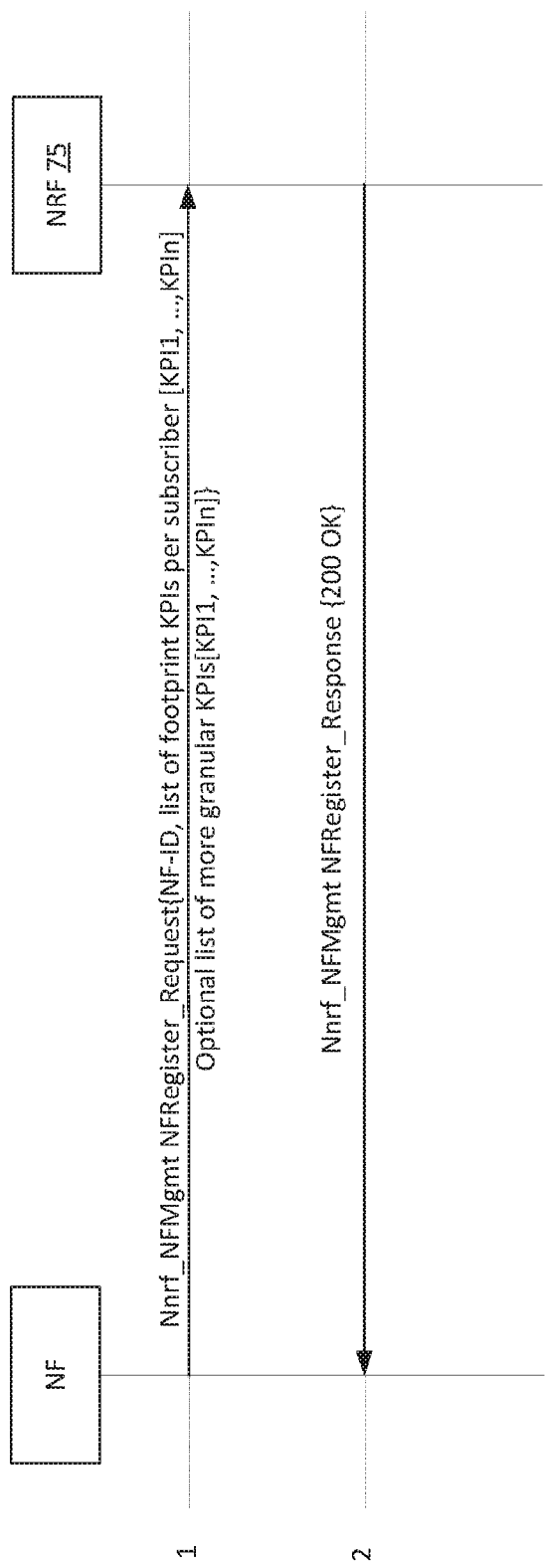
FIG. 3 illustrates an exemplary registration procedure for registering a capability of providing packet inspection parameters with a network repository function (NRF).

To make the information available to other NFs, the UPF 35 registers its service offering with the NRF 75. FIG. 3 illustrates a general procedure implemented by a NF (e.g., UPF 35) to register the capability of providing per subscriber PIPs, also referred to herein as footprint data. The NF sends a registration request (Nnrf_NFManagement NFRegister_Request) to the NPF 75 over the Nnrf interface to register the capability of providing per subscriber footprint data to other NFs (1). The registration request includes a NF identifier, NF-ID and a list of PIPs available per subscriber. The registration request may optionally include a list of PIPs available per service. The NRF 75 answers with 200 OK to confirm the successful registration (2).

Figure 4:
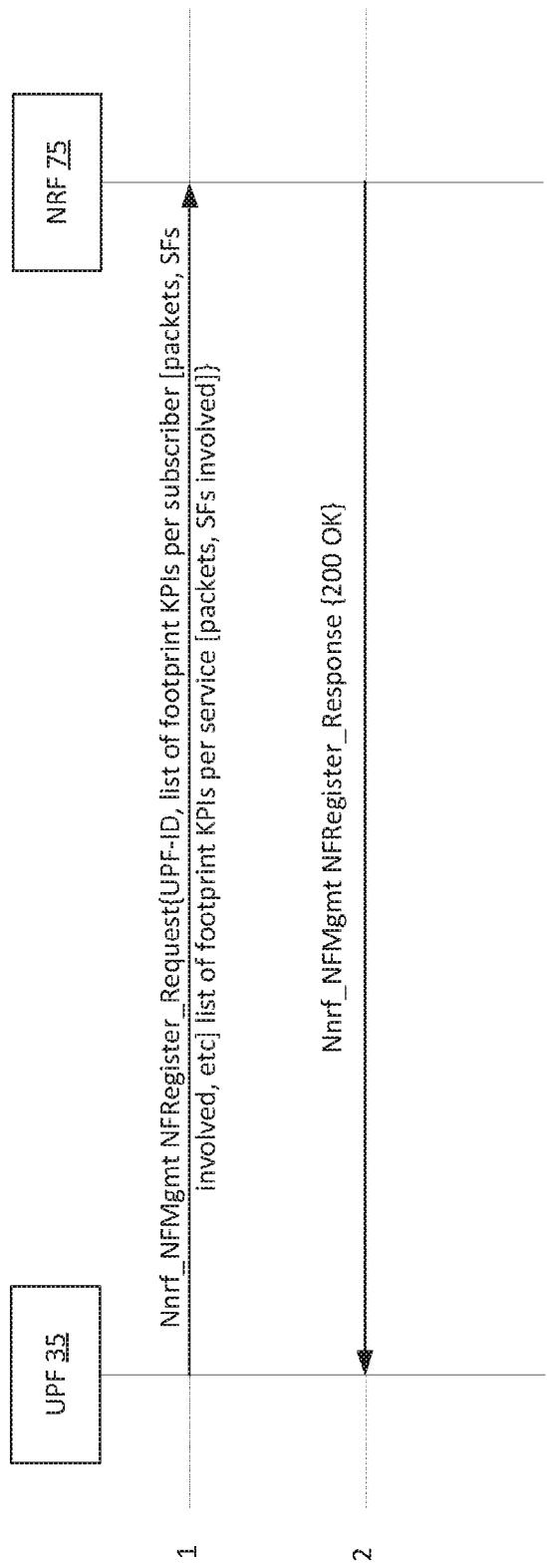
FIG. 4 illustrates UPF registration with the NRF to register a capability of providing packet inspection parameters with a network repository function (NRF).

FIG. 4 illustrates a more detailed example of UPF registration with the NRF 75. In this example, the UPF 35 registers the capability of providing per subscriber footprint data to other NFs. The UPF 35 sends a registration request (Nnrf_NFManagement NFRegister_Request) to the NPF 75 over the Nnrf interface to register the capability of providing PIPs to other NFs. The registration request includes a UPF identifier, UPF-ID and a list of PIPs available per subscriber. In this example, the list of PIPs includes the number of packets needed to be inspected and the SFs involved for the subscriber. The registration request may optionally include a list of PIPs available per service. This list includes the number of packets needed to be inspected and the SFs involved for the subscriber. The NRF 75 answers with 200 OK to confirm the successful registration (2). Those skilled in the art will appreciate that the list of PIPs can include other PIPs as listed above.

Once the UPF 35 registers with the NRF 75, the NWDAF 90 can discover the exposure service offered by the UPF 35 and subscribe to the exposure service using the new Nupf interface. Thus, the NWDAF 90 may subscribe to receive footprint data from multiple UPFs 35 within the communication network 10. Additionally, the NWDAF 90 can request or collect information from other NFs relevant to the calculation of a computational footprint for a PDU session. For example, the NWDAF 90 may collect information about traffic volumes associated with packet flows from the PCF 50. Based on the information collected from the UPFs 35 and other NFs, the NWDAF 90 generates a model for the computational footprint for each subscriber or subscriber type and stores the computed computational footprint for each subscriber or subscriber type in the UDR 55. The computational footprint can be stored by the UDR 55 as part of the subscriber profile.

Figure 5:
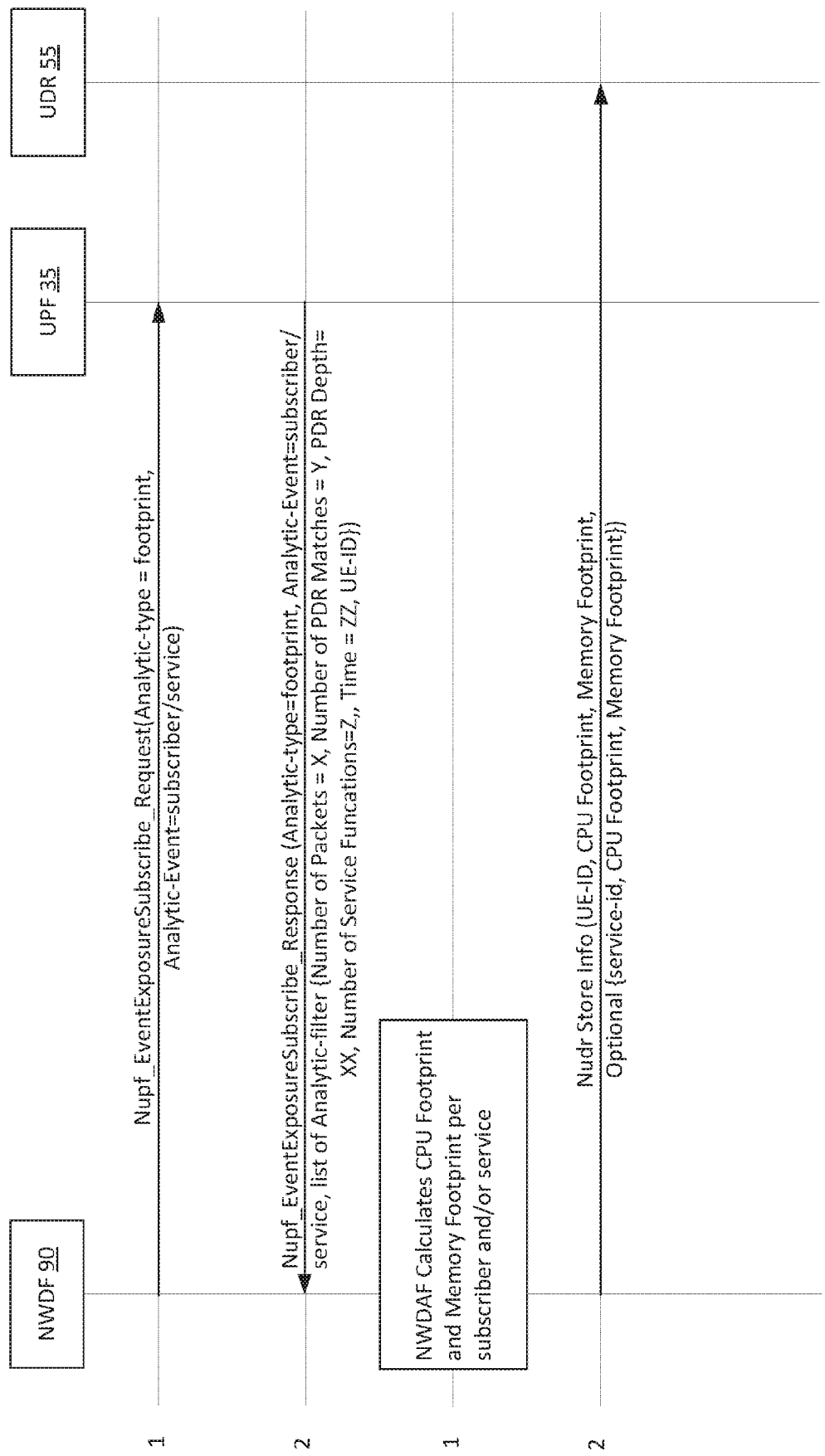
FIG. 5 illustrates data collection and computation of per subscriber computational footprints associated with packet inspection in a PDU session.

FIG. 5 illustrates an exemplary procedure implement by the NWDAF 90 to collect footprint data and generate a computational footprint model. The NWDAF 90 sends a subscription request (Nupf_EventExposureSubscribe_Request) to the UPF 35 over the Nupf interface to subscribe to the Event Exposure service offered by the UPF 35 (1). The subscription request indicates the type of data requested (e.g., "footprint data") and the event trigger (e.g., subscriber/service) for the subscription. The UPF 35 answers with a 200 OK to confirm the subscription (2) or with an immediate response (Nupf_EventExposureSubscribe_Response) containing the requested information. When the event trigger is "subscriber", the subscription response includes the PIPs for each subscriber. When the event trigger is "service", the subscription response includes the PIPs for each subscriber. In the example shown in FIG. 5, the PIPs included in the subscription response include the number of packets, number of PDRs, PDR depth, number of SFs and packet inspection time for each subscriber or service. Following the initial response, the UPF 35 may send a notification message to the NWDAF 90 periodically or in response to a triggering event for each subscriber or service. For example, the UPF 35 may collect footprint data during each PDU session and send the footprint data for the subscriber and/or service to the NWDAF 90 at the end of each PDU session.

Based on the footprint data collected from the UPFs 35 and other relevant information collected from other NFs, the NWDAF 90 generates a model of the computational resource demand in terms of CPU usage and memory usage and calculates the CPU footprint and memory footprint for each subscriber (3). The applied model may be a generic model applied to all subscribers or a subscriber-specific model. In some embodiments, the NWDAF 90 may also calculate the CPU footprint and memory footprint for each service type for each subscriber. The NWDAF 90 then sends a request to the UDR 55 to store the computed CPU footprint and the computed memory footprint for each subscriber and/or service to the UDR 55 (4). In embodiments where a subscriber-specific model is used, the UDR 55 can also store the model and related state variables.

As new data arrives from the UPFs 35 or other NFs, the NWDAF 90, the NWDAF 90 can dynamically update the CPU footprints and memory footprints based on the new information. If a subscriber-specific model is used to generate the footprints, the NWDAF 90 can retrieve the model and related state variables from the UDR 55 and compute revised CPU and memory footprints based on the new data.

Once the computational footprints are stored In the UDR 55, the computational footprints are available to the SMF 45 for use in selecting the UPF 35 for a PDU session. After receiving a request to create a PDU session for a subscriber, the SMF 45 can retrieve the CPU footprint and/or memory footprint for the subscriber and/or service from the UDR 55. The SMF 45 can use the subscriber footprint along with other information to select the UPF 35. For example, the SMF 45 may employ a strategy of evenly distributing PDU sessions with large CPU and memory footprints among the available UPFs 35. As another example, the SMF 45 may have a group of preferred UPFs 35 for PDU sessions associated with large computational footprints.

Figure 6:
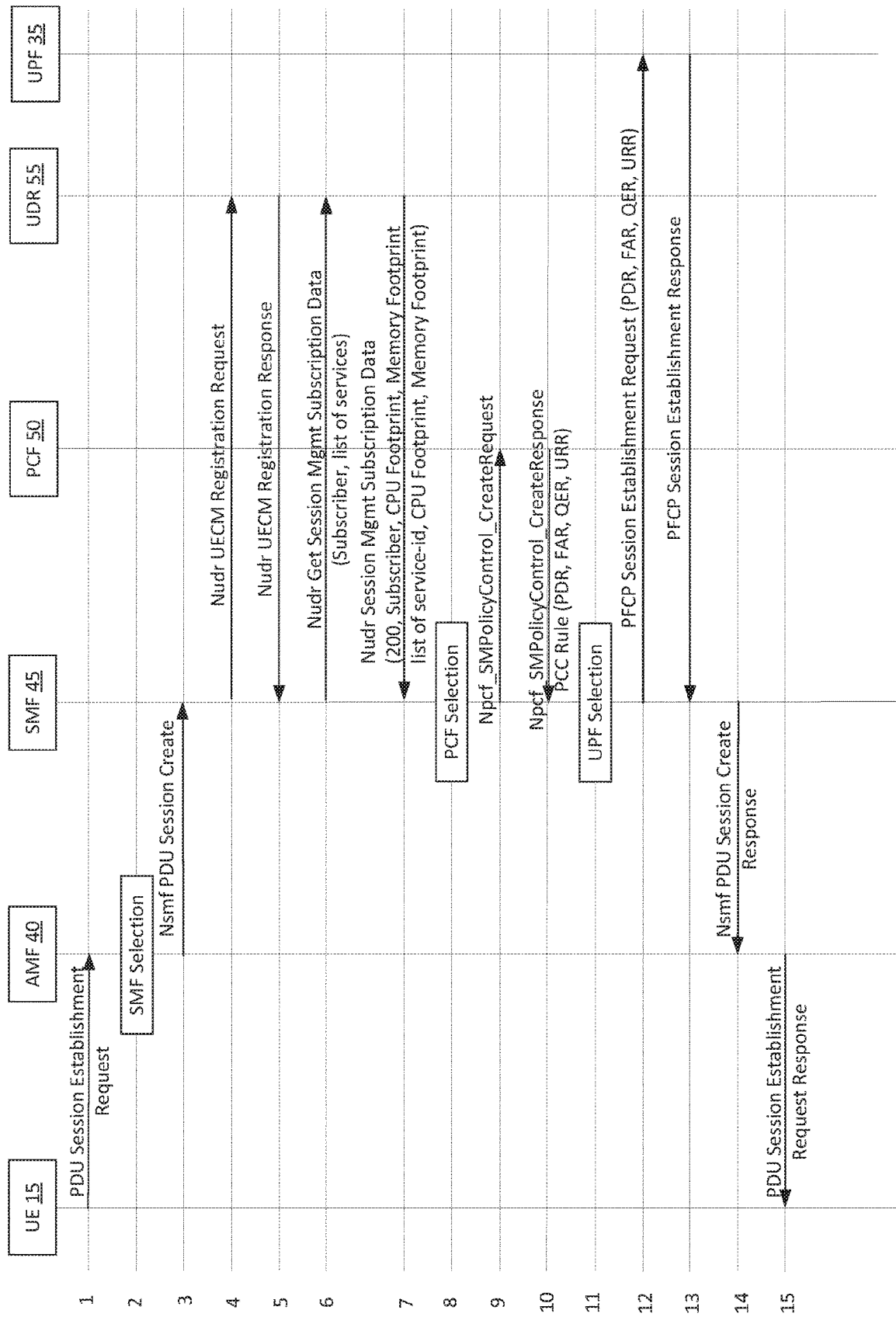
FIG. 6 illustrates UPF selection based on per subscriber computational footprints.

FIG. 6 illustrates UPF selection based on per subscriber inspection complexity metrics. The UE 15 sends a Session Establishment Request to the AMF 40 (10). The AMF (40) selects a SMF 45 for the PDU session and sends a PDU Session Create Request to the selected SMF 45 (2, 3). The SMF 45 sends a registration request to the UDR 55 and receives a registration response (4, 5). Then the SMF 45 requests the subscription profile for the subscriber and list of services from the UDR 55 (6). The UDR 55 answers with the subscription profile that includes the CPU footprint and memory footprint for the subscriber and/or services associated with the PDU session (7). The SMF 45 selects the PCF 50 and establishes a policy control session (8-10). To establish the policy control session, the SMF 45 sends a Policy Control Create Request to the PCF 50 (9). The PCF 50 answers with a Policy Control Create Response that includes, among other things, the PDRs to be applied for packet flow classification (10). After the policy control session is established, the SMF 45 selects the UPF 35 for the PDU session (11). As previously describe, the UPF selection is based at least in part on the CPU footprint and/or memory footprint received from the UDR 55. After selecting the UPF 35, the SMF 45 sends a Packet Forwarding Control Protocol (PFCP) Session Establishment Request to the UPF 35 (12). The UPF 35 answers with a PFCP Session Establishment Response (13). The SMF 45 then sends a PDU Session Create Response to the AMF 40 (14). The AMF 40 sends a PDU Session Establishment Request Response to the UE 15 (15).

Figure 7:
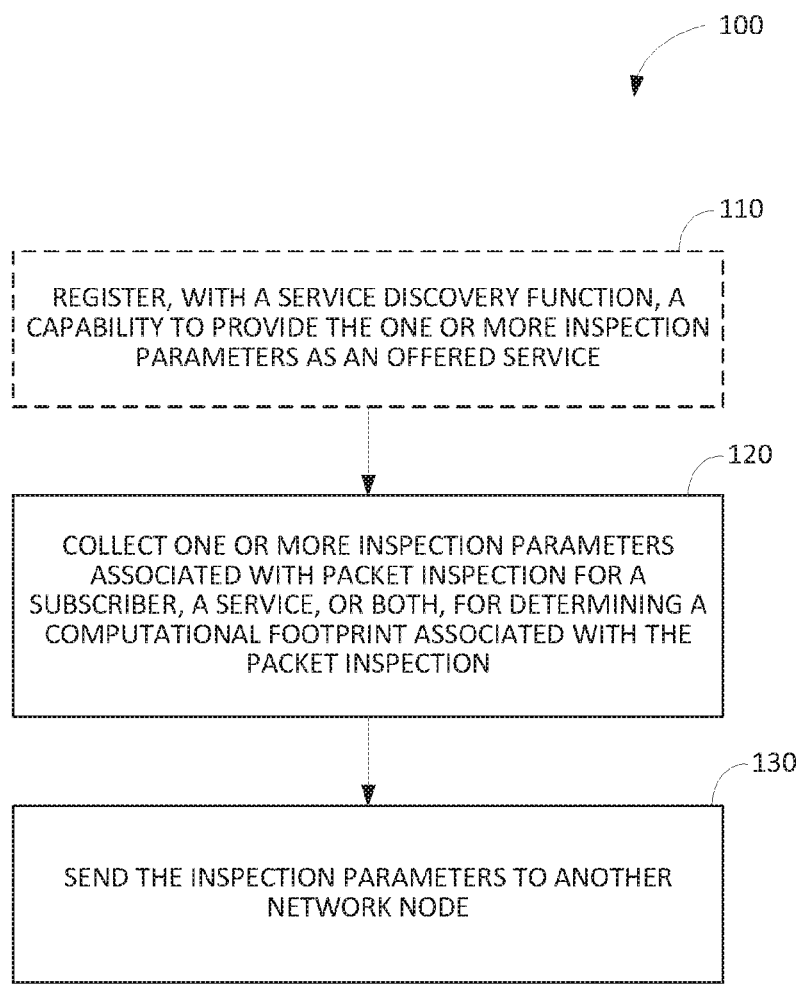
FIG. 7 illustrates an exemplary procedure implemented by a UPF for providing per subscriber packet inspection parameters used to compute per subscriber computational footprints associated with packet inspection in a PDU session.

FIG. 7 illustrates an exemplary method 100 implemented by a UPF 35 for providing inspection complexity indicators used to compute inspection complexity metrics for UPF selection. The UPF 35 optionally registers, with a service discovery function (e.g., NRF 75), a capability to provide one or more inspection parameters for packet data inspection (block 110). The UPF 35 collects one or more inspection parameters associated with packet inspection for a subscriber, a service, or both, for determining a computational footprint associated with the packet inspection (block 120). The UPF 35 sends the inspection parameters to another network node (e.g., NWDAF 90) (block 130).

In some embodiments of the method 100, sending the inspection parameters to another network node comprises receiving a request for the inspection parameters from a consumer node, and sending, responsive to the request, the inspection parameters to the consumer node. The consumer node may comprise, for example a NWDAF 90 or other data analytics function. The inspection parameters may comprise, for example, one or more of an average number of packets inspected to classify a traffic flow, a number of packet detection rules (PDR) to apply to the traffic flow, an average number of PDRs applied to classify a traffic flow, a number of service functions to be traversed according to a policy, an average time needed to classify a traffic flow, or a type of analysis used for classifying the traffic flow.

In some embodiments of the method 100, the inspection parameters comprise per subscriber inspection parameters for one or more subscribers.

In some embodiments of the method 100, the inspection parameters comprise per service inspection parameters for one or more services.

In some embodiments of the method 100, the inspection parameters comprise per service inspection parameters for each service for each of one or more subscribers.

In some embodiments of the method 100, the inspection parameters comprise per subscriber type inspection parameters for each of one or more subscriber types.

Figure 8:
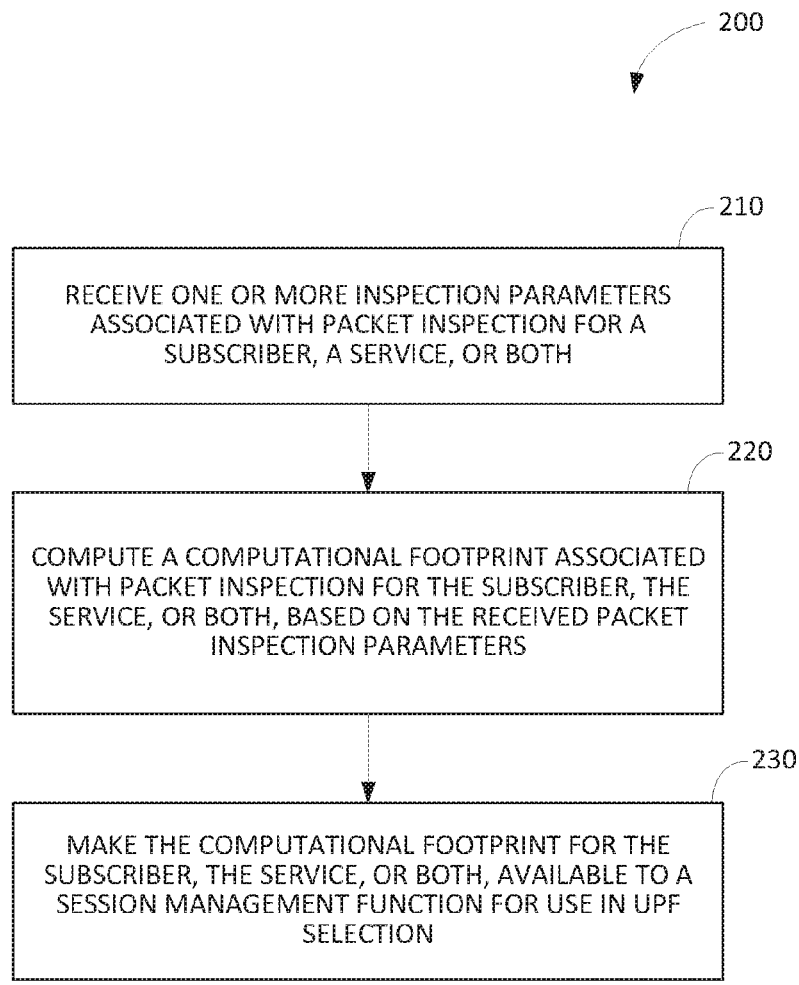
FIG. 8 illustrates an exemplary procedure implemented by a NWDAF for computing per subscriber computational footprints associated with packet inspection in a PDU session for UPF selection.

FIG. 8 illustrates an exemplary method 200 implemented by a NWDAF 90 or other network node for computing a computational footprint for use in UPF selection. The NWDAF 90 receives one or more inspection parameters associated with packet inspection for a subscriber, a service, or both (block 210). The NWDAF 90 further computes a computational footprint associated with packet inspection for the subscriber, the service, or both, based on the received packet inspection parameters (block 220). Finally, the NWDAF 90 makes the computational footprint for the subscriber, the service, or both, available to a session management function or other network node for use in UPF selection (block 230).

In some embodiments of the method 200, receiving one or more inspection parameters associated with packet inspection for a subscriber, a service, or both comprise sending a service request for the inspection parameters to a producer node, and receiving the inspection parameters from the producer node responsive to the request. The producer node may comprise, for example, a UPF 35. The inspection parameters may comprise, for example, one or more of an average number of packets inspected to classify a traffic flow, a number of packet detection rules (PDR) to apply to the traffic flow, an average number of PDRs applied to classify a traffic flow, a number of service functions to be traversed according to a policy, an average time needed to classify a traffic flow, or a type of analysis used for classifying the traffic flow.

In some embodiments of the method 200, the inspection parameters comprise per subscriber inspection parameters for one or more subscribers.

In some embodiments of the method 200, the inspection parameters comprise per service inspection parameters for one or more services.

In some embodiments of the method 200, the inspection parameters comprise per service inspection parameters for each service for each of one or more subscribers.

In some embodiments of the method 200, the inspection parameters comprise per subscriber type inspection parameters for each of one or more subscriber types.

In some embodiments of the method 200, making the computational footprint for the subscriber, the service, or both, available to a session management function for use in UPF selection comprises storing the computational footprint in a data repository, such as a UDR 55.

Figure 9:
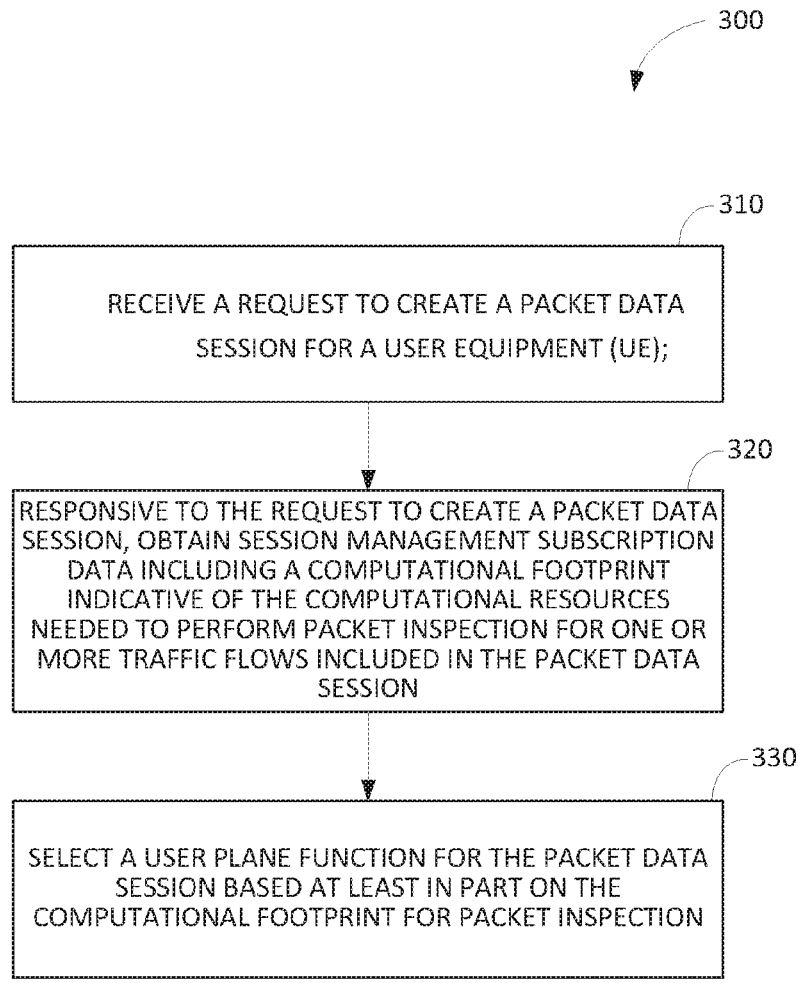
FIG. 9 illustrates an exemplary method implemented by a SMF for selecting a UPF based on per subscriber computational footprints associated with packet inspection in a PDU session.

FIG. 9 illustrates an exemplary method 300 implemented by a SMF for selecting a UPF 35 based on inspection complexity metrics. The SMF 45 receives a request to create a packet data session for UE 15 (block 310). Responsive to the request to create a packet data session, the SMF 45 obtains session management subscription data including a computational footprint indicative of the computational resources needed to perform packet inspection for one or more traffic flows included in the packet data session (block 320). The SMF 45 then selects a UPF 35 for the packet data session based at least in part on the computational footprint for packet inspection (block 330).

In some embodiments of the method 300, obtaining the session management data comprises retrieving the session management data from a subscriber database.

In some embodiments of the method 300, the computational footprint comprises a CPU demand, a memory demand, or both, associated with the user equipment.

In some embodiments of the method 300, the computational footprint comprises a CPU demand, a memory demand, or both, for each of one or more services associated with the packet data session.

In some embodiments of the method 300, the computational footprint comprises a CPU demand, a memory demand, or both, for each of one or more services associated with the packet data session for the UE.

Figure 10:
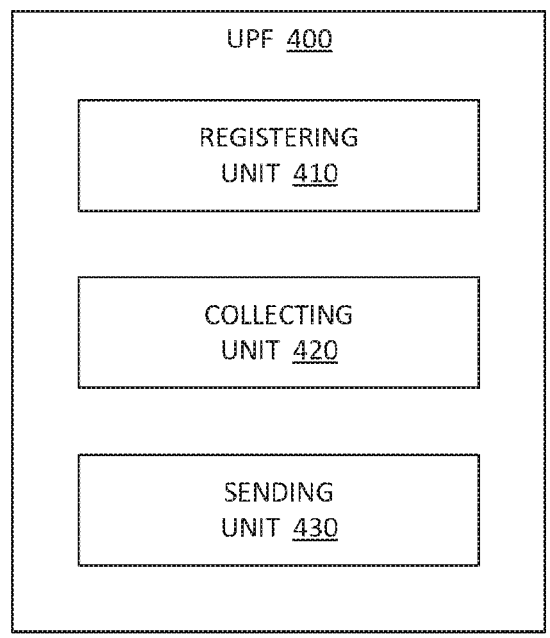
FIG. 10 illustrates an exemplary UPF configured to provide per subscriber packet inspection parameters used to compute per subscriber computational footprints associated with packet inspection in a PDU session.

FIG. 10 illustrates an exemplary UPF400 configured to provide inspection parameters used to compute computational footprints of packet flows for UPF selection. The UPF400 comprises an optional registering unit 410, a collecting unit 420, and a sending unit 430. The various units 410-430 can be implemented by hardware and/or by software code that is executed by a processor or processing circuit. The registering unit 410, when present, is configured to register, with a service discovery function, a capability to provide the one or more inspection parameters as an offered service. The collecting unit 420 is configured to collect one or more inspection parameters associated with packet inspection for a subscriber, a service, or both, for determining a computational footprint associated with the packet inspection. The sending unit 430 is configured to sending the inspection parameters to another network node.

Figure 11:
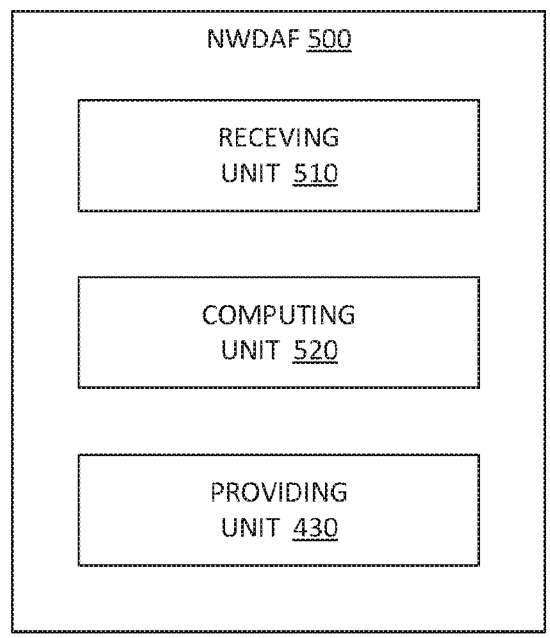
FIG. 11 illustrates an exemplary NWDAF configured to compute per subscriber computational footprints associated with packet inspection in a PDU session for UPF selection.

FIG. 11 illustrates an exemplary NWDAF 500 configured to provide inspection complexity metrics for UPF selection. The NWDAF 500 comprises a receiving unit 510, a computing unit 520 and a providing unit 530. The various units 510-530 can be implemented by hardware and/or by software code that is executed by a processor or processing circuit. The receiving unit 510 is configured to receive one or more inspection parameters associated with packet inspection for a subscriber, a service, or both. The computing unit 520 is configured to compute a computational footprint associated with packet inspection for the subscriber, the service, or both, based on the received packet inspection parameters. The providing unit 530 is configured to make the computational footprint for the subscriber, the service, or both, available to a session management function for use in UPF selection.

Figure 12:
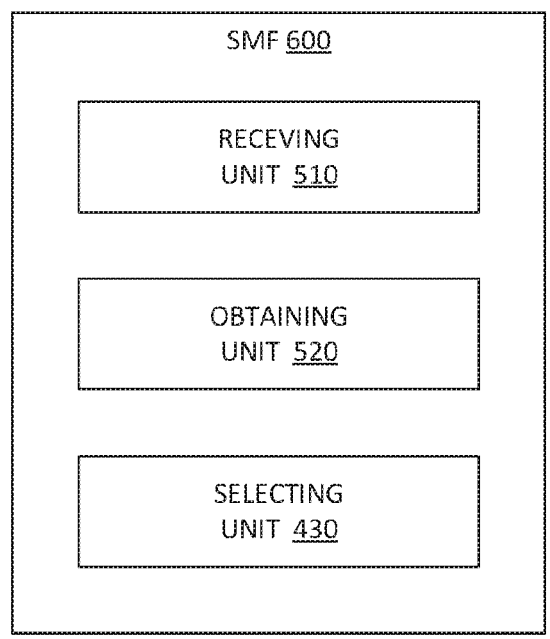
FIG. 12 illustrates an exemplary SMF configured to select a UPF based on per subscriber computational footprints associated with packet inspection in a PDU session for UPF selection.

FIG. 12 illustrates an exemplary SMF 600 configured to select a UPF based on inspection complexity metrics. The SMF 600 comprises a receiving unit 610, an obtaining unit 620 and a selecting unit 630. The various units 610-630 can be implemented by hardware and/or by software code that is executed by a processor or processing circuit. The receiving unit 610 is configured to receive a request to create a packet data session for a UE 15. The obtaining unit 620 is configured to, responsive to the request to create a packet data session, obtain session management subscription data including a computational footprint indicative of the computational resources needed to perform packet inspection for one or more traffic flows included in the packet data session. The selecting unit 630 is configured to selecting a user plane function for the packet data session based at least in part on the computational footprint for packet inspection.

Figure 13:
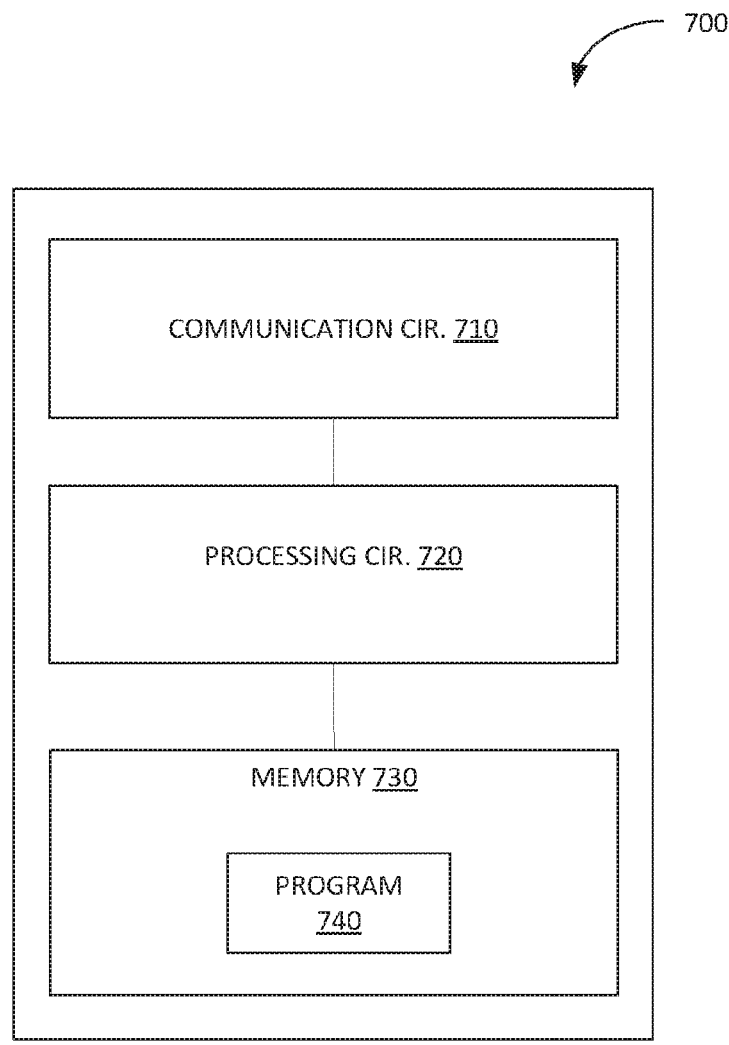
FIG. 13 illustrates a network node that can be configured to implement the UPF selection methods s herein described.

FIG. 13 illustrates the main functional components of a network node that can be configured as an exposing network node 500, a producer network node 600, a consumer network node 700, or some combination thereof. The network node 700 comprises communication circuitry 710, processing circuitry 720, and memory 730.

The communication circuitry 710 comprises network interface circuitry for communicating with other core network nodes in the communication network over a communication network, such as an Internet Protocol (IP) network.

Processing circuitry 720 controls the overall operation of the network node 700 and is configured to perform one or more of the methods 100, 150, 200 and 300 shown in FIGS. 7-11 respectively. The processing circuitry 720 may comprise one or more microprocessors, hardware, firmware, or a combination thereof.

Memory 730 comprises both volatile and non-volatile memory for storing computer program code and data needed by the processing circuitry 720 for operation. Memory 730 may comprise any tangible, non-transitory computer-readable storage medium for storing data including electronic, magnetic, optical, electromagnetic, or semiconductor data storage. Memory 730 stores a computer program 740 comprising executable instructions that configure the processing circuitry 720 to implement one or more of the methods 100, 200, and 300 shown in FIGS. 7-9 respectively. A computer program in this regard may comprise one or more code modules corresponding to the means or units described above. In general, computer program instructions and configuration information are stored in a non-volatile memory, such as a ROM, erasable programmable read only memory (EPROM) or flash memory. Temporary data generated during operation may be stored in a volatile memory, such as a random access memory (RAM). In some embodiments, computer program 740 for configuring the processing circuitry 720 as herein described may be stored in a removable memory, such as a portable compact disc, portable digital video disc, or other removable media. The computer program 740 may also be embodied in a carrier such as an electronic signal, optical signal, radio signal, or computer readable storage medium.

Those skilled in the art will also appreciate that embodiments herein further include corresponding computer programs. A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

The UPF selection techniques as herein described enables more accurate load balancing of subscribers and network resources based on internal user plane metrics instead of conventional reporting/charging statistics. Unbalanced loads can lead to increased latency and power consumption in some network functions, while resources in other network functions remain unused. Thus, the improvement in load balancing improves latency, power consumption and resource utilization efficiency.

What is claimed is:

1. A method implemented by a network node in a wireless communication network to support selection of a user plane function (UPF) by a session management function (SMF) for a packet data session, the method comprising:
   collecting one or more inspection parameters associated with packet inspection for a subscriber, a service, or both, for determining a per subscriber and/or or per service computational footprint associated with the packet inspection, wherein the computational footprint is indicative of the computational resources needed to perform packet inspection for one or more traffic flows included in the packet data session; and
   sending the inspection parameters to another network node.

2. The method of claim 1, further comprising registering, with a service discovery function, a capability to provide the one or more inspection parameters as an offered service.

3. The method of claim 1, wherein sending the inspection parameters to another network node comprises:
   receiving a request for the inspection parameters from a consumer node; and
   sending, responsive to the request, the inspection parameters to the consumer node.

4. The method of claim 3, wherein the consumer node comprises a data analytics function.

5. The method of claim 1, wherein the inspection parameters include one or more of:
   an average number of packets inspected to classify a traffic flow;
   a number of packet detection rules (PDR) to apply to the traffic flow;
   an average number of PDRs applied to classify a traffic flow;
   a number of service functions to be traversed according to a policy;
   an average time needed to classify a traffic flow; or
   a type of analysis used for classifying the traffic flow.

6. The method of claim 1, wherein the inspection parameters comprise per subscriber inspection parameters for one or more subscribers.

7. The method of claim 1, wherein the inspection parameters comprise per service inspection parameters for one or more services.

8. The method of claim 1, wherein the inspection parameters comprise per service inspection parameters for each service for each of one or more subscribers.

9. The method of claim 1, wherein the inspection parameters comprise per subscriber type inspection parameters for each of one or more subscriber types.

10. A method implemented by a network node in a wireless communication network to support selection of a user plane function (UPF) by a session management function (SMF) for a packet data session, the method comprising:
receiving one or more inspection parameters associated with packet inspection for a subscriber, a service, or both;
computing a per subscriber and/or or per service computational footprint associated with packet inspection for the subscriber, the service, or both, based on the received packet inspection parameters, wherein the computational footprint is indicative of the computational resources needed to perform packet inspection for one or more traffic flows included in the packet data session; and
making the computational footprint for the subscriber, the service, or both, available to a session management function for use in UPF selection.

11. The method of claim 10, wherein receiving one or more inspection parameters associated with packet inspection for a subscriber, a service, or both, comprises:
sending a service request for the inspection parameters to a producer node; and
receiving the inspection parameters from the producer node responsive to the request.

12. The method of claim 11 wherein the producer node comprises a UPF.

13. The method of claim 10, wherein the inspection parameters include one or more of:
an average number of packets inspected to classify a traffic flow;
a number of packet detection rules (PDR) to apply to the traffic flow;
an average number of PDRs applied to classify a traffic flow;
a number of service functions to be traversed according to a policy;
an average time needed to classify a traffic flow; or
a type of analysis used for classifying the traffic flow.

14. The method of claim 10, wherein the inspection parameters comprise per subscriber inspection parameters for one or more subscribers.

15. The method of claim 10, wherein the inspection parameters comprise per service inspection parameters for one or more services.

16. The method of claim 10, wherein the inspection parameters comprise per service inspection parameters for each service for each of one or more subscribers.

17. The method of claim 10, wherein the inspection parameters comprise per subscriber type inspection parameters for each of one or more subscriber types.

18. The method of claim 10, wherein making the computational footprint for the subscriber, the service, or both, available to a session management function for use in UPF selection comprises storing the computational footprint in a data repository.

19. A method implemented by a session management node in a wireless communication network of selecting a user plane function (UPF) for a packet data session, the method comprising:
receiving a request to create a packet data session for a user equipment (UE);
responsive to the request to create a packet data session, obtaining session management subscription data including a per subscriber and/or or per service computational footprint indicative of the computational resources needed to perform packet inspection for one or more traffic flows included in the packet data session; and
selecting a user plane function for the packet data session based at least in part on the computational footprint for packet inspection.

20. The method of claim 19, wherein obtaining the session management data comprises retrieving the session management data from a subscriber database.

21. The method of claim 19, wherein the computational footprint comprises a CPU demand, a memory demand, or both, associated with the user equipment.

22. The method of claim 19, wherein the computational footprint comprises a CPU demand, a memory demand, or both, for each of one or more services associated with the packet data session.

23. The method of claim 19, wherein the computational footprint comprises a CPU demand, a memory demand, or both, for each of one or more services associated with the packet data session for the UE.

24. The method of claim 1, further comprising:
receiving, from a user equipment (UE), a request to establish the packet data session; and
selecting, responsive to the request, a UPF for the packet data session based on the computational footprint.

* * * * *